United States Patent Office 3,781,292
Patented Dec. 25, 1973

3,781,292
SYNTHESIS OF PYRIDINE BASES FROM OLEFINS
Yasuo Kusunoki, Hiroshi Okazaki, Yoshinori Sato, and Eiichi Sano, Kitakyushu, Japan, assignors to Yawata Chemical Industry Co., Ltd., Tokyo, Japan
No Drawing. Continuation of abandoned application Ser. No. 816,401, Apr. 15, 1969. This application Nov. 2, 1971, Ser. No. 195,042
Claims priority, application Japan, Apr. 19, 1968, 43/25,868
Int. Cl. C07d 31/06
U.S. Cl. 260—290 P                                    15 Claims

ABSTRACT OF THE DISCLOSURE

Method for synthesizing pyridine bases by reacting olefins with ammonia in the presence of a palladium tetrammine complex which is provided with prolonged activity by means of a copper (II) salt and oxygen.

---

This application is a continuing application of Ser. No. 816,401, filed Apr. 15, 1969, now abandoned.

This invention relates to a method for synthesizing pyridine bases, and more particularly, it relates to a method for synthesizing pyridine bases directly from olefins and ammonia.

Pyridine bases have been recovered from coal tar for a considerable length of time. In recent years, however, a number of synthetic methods have been developed, and some of them are being put to commercial use. Such methods employ aliphatic aldehydes and ammonia as raw materials.

While synthesis of pyridine bases starting from an unsaturated hydrocarbon as a major raw material is known, a large body of literature directed to this method is concerned with acetylene, and only a limited number of publications are available on the synthesis of pyridine bases from olefins in liquid phase. For example, the reaction of ethylene in the presence of mercury acetate is described in "Zeitschrift fuer Naturforschung" 4b, 123 (1949). However, the present inventors have found as a result of re-examination that such reaction is not satisfactory for commercial use in the light of the difficulty of operation and complexity in the kind and quantity of products produced.

This invention relates to a direct synthesis of pyridine bases from olefins and ammonia. Olefins and ammonia, when heated in liquid phase in the presence of a palladium tetrammine complex, react to yield pyridine bases. In the co-presence of a copper (II) salt, the amount of palladium required for obtaining a given quantity of pyridine base can be markedly reduced. Moreover, the synthetic activity of the complex can be maintained for a long time by introducing oxygen into the reaction system, and even when the complex and the copper salts lose their activity for synthesizing pyridine bases, such activity can be regenerated by introduction of oxygen.

An object of this invention is to provide a method for synthesizing pyridine bases directly from olefins and ammonia.

Another object of this invention is to provide a method for minimizing the quantitative requirement of palladium, an expensive material, in the synthesis and for maintaining the activity of the complex over a long period of time.

A further object of this invention is to provide a method wherein the kind and composition of pyridine bases produced can be varied within certain limits by a proper selection of reaction conditions.

A still further object of this invention is to provide an efficient and economical method for synthesizing pyridine bases from olefins and ammonia.

These objects will be explained in detail in the following.

Olefins and ammonia are essential as sources of carbon and nitrogen, respectively, in the synthesis of pyridine bases according to the method of this invention, a third component being added as required.

The olefins utilized are exemplified by normal alkenes and normal alkadienes, both having 2–4 carbon atoms, such as ethylene, propylene, butenes, butadiene and the like. It is particularly preferable to use ethylene, as it excels in the reaction velocity and yield of the pyridine bases. A mixture of two or more olefins, optionally in admixture with inert gases, may also be utilized.

Olefins react with ammonia in the presence of the palladium tetrammine complex to form pyridine bases. Therefore, any compound of divalent palladium capable of forming the palladium tetrammine complex, such as palladium halide (e.g. fluoride, chloride, bromide and iodide), nitrate, phosphate, acetate and sulfate, may be introduced into the reaction system. Alternatively, the complex itself may of course be introduced into the reaction system. It is important to understand, however, that the particular donor compound is immaterial, as long as it forms the palladium tetrammine complex when introduced into the reaction system.

The mechanism of this reaction is not clear, but it appears likely that the donor compound dissolves in the reaction system and that the divalent palladium reacts with ammonia to form the palladium tetrammine cation and anion and that this cation reacts with olefins. The palladium donor compound should be used in such an amount that the molar ratio of palladium, as metal, to the olefins is approximately unity.

The reaction is carried out by bringing olefins into contact with an aqueous solution of ammonia or, if necessary, with an aqueous solution of ammonia containing an alcohol as a solvent in the presence of the palladium compound.

Ammonia should be present in such an amount as to convert the palladium compound to a water-soluble palladium tetrammine complex in order for the reaction to proceed smoothly in a homogeneous phase, this amount preferably being at least 2 times, more preferably 4 to 10 times, the palladium compound, as metal, expressed in moles. When the molar ratio of ammonia to palladium is less than 2, the palladium tetrammine complex is not formed and the reaction does not proceed.

The reaction is carried out in an aqueous solution of ammonia containing 0.5 to 5 moles of palladium compound, as metal, per liter of solution at a temperature of 100 to 300° C., preferably 200 to 250° C., and at a pressure of at least 20, and preferably 20 to 100 kg./cm.$^2$ gauge. The reaction pressure is selected in consideration of the solubility of olefins in the aqueous solution, the concentration of ammonia, the reaction rate and the like.

When the reaction of olefins with ammonia is allowed to proceeds under the foregoing conditions, the rate of reaction gradually falls with the passage of time until the reaction stops completely. In such a state, the originally divalent palladium is reduced completely and separates out as a metallic deposit. Since palladium compounds are expensive, the requirement of such compounds in a commercial operation becomes of prime importance. The present inventors have discovered that the presence of a copper (II) salt in the catalyst solution causes the reaction to proceed satisfactorily with a minimum quantity of palladium. When the copper salt is added to the catalyst solution in advance, in an amount of 1 to 2 moles, as metal, per mole of olefin, the reaction takes place with a much smaller amount of palladium compound than would be required when the palladium compound is used singly.

Examples of the copper salt are copper sulfate, copper nitrate, copper phosphate, copper acetate, and copper halides (e.g. fluoride, chloride, bromide and iodide). It is considered that these copper compounds do not participate directly in the reaction of olefins with ammonia, but rather prevent palladium from being reduced during the reaction, or else oxidize the reduced palladium to the divalent form. Thus, it is apparent that even those forms of palladium which do not ordinarily yield divalent palladium may be utilized in the presence of the copper salt. For example, even metallic palladium will be oxidized to the divalent state by the copper (II) and participate in the reaction.

Just as the palladium compounds react with the ammonia in the reaction system to yield the palladium tetrammine cation $[Pd(NH_3)_4]^{++}$ and anion $X^-$, so also do the copper compounds react with the ammonia to yield the copper tetrammine cation $[Cu(NH_3)_4]^{++}$ and anion $X^-$, where X is, for example, F, Cl, Br, I, $NO_3$, $PO_4$, $OCOCH_3$ or $SO_4$, as indicated above for the donor palladium compound.

The quantitative relationship between palladium and copper is not limited, but economic considerations favor as much reduction as possible for the palladium requirement. It has been determined that a reduction of palladium down to about $\frac{1}{200}$ of a mole per mole of copper does not affect the reaction rate seriously and the selectivity is rather improved by such a reduction. Generally, the molar ratio of $[Pd(NH_3)_4]^{++}$ to $[Cu(NH_3)_4]^{++}$ is from 1:20 to 1:200.

The amount of ammonia in the reaction system is preferably 2 to 10 times the total number of moles of palladium and copper, both as metal, and the latter total is preferably 0.5 to 5 moles per liter of the aqueous solution of ammonia.

Upon completion of the reaction, the palladium compound was found to have been reduced to metallic palladium, and the copper compound to cuprous or metallic copper. A further study revealed that, in the co-presence of palladium and copper, oxygen maintains the synthetic activity of the system, or it can be regenerated, when depleted, by introduction of oxygen. The oxygen can be introduced as pure oxygen or a mixture of oxygen and inert gases, such as argon, nitrogen and so on, during the reaction or after stopping the reaction.

It is known that olefins can be oxidized to aldehydes or ketones by the palladium-copper catalyst and that the synthetic activity in such a reaction can be regenerated by oxygen. Moreover, the reaction mechanism has been studied in detail, for example, by P. M. Henry [J. Am. Chem. Soc., 86, 3246 (1964)] and K. Teramoto et al. [Journal of Synthetic Organic Chemistry, Japan, 21, 298 (1963)]. According to these reports, the reaction rate is said to be inversely proportional to $[H^+]$ $[Cl^-]$, but in practice the presence of an acid such as HCl appears to be essential for the progress of the reaction and regeneration of synthetic activity. In the method of this invention, however, both the reaction and the regeneration of synthetic activity are carried out in a state where excess ammonia is present, and aside from the fact that palladium and copper compounds are used in the above-mentioned method as well as in the present method, the mechanism of the regeneration of synthetic activity is considered to be entirely different for these two methods.

The introduction of oxygen should preferably be carried out in the presence of ammonia, but the presence or absence of olefins and pyridine bases is not important. Oxygen may be introduced at any stage in a suitable manner, for example, by stopping the reaction at an appropriate time or while the reaction is in progress. This regenerative operation can be conducted at room temperature under atmospheric pressure, but it may be completed in a shorter time at 50 to 300° C. and under atmospheric or elevated pressure.

The kind and composition of pyridine bases to be produced by the method of this invention can be varied to some extent depending upon the reaction conditions. Generally, both pyridine and alkylpyridines, e.g. lower alkyl-pyridines can be produced. For example, the reaction of ethylene with ammonia yields mainly 2-methyl-5-ethylpyridine and α-picoline. However, the same reaction yields mainly pyridine and β-picoline when formaldehyde, paraformaldehyde, trioxane, methylene chloride, methylal, methanol, methylamine, chloroform, formic acid or formamide is present in the reaction system.

Moreover, the composition of pyridine bases can be varied depending upon the kind of anion in the system. For example, in the reaction of ethylene and ammonia, nitrate ions favor formation of α-picoline more than 2-methyl-5-ethylpyridine, whereas chloride ions or acetate ions favor 2-methyl-5-ethylpyridine more than α-picoline. When the reaction involves ethylene, ammonia, and formaldehyde, nitrate ions favor pyridine more than β-picoline, whereas chloride ions or acetate ions favor β-picoline more than pyridine.

If necessary, $NH_4X$ or HX, in the presence of excess ammonia, may be added to the reaction system as an anion source, wherein X is $NO_3$, $(SO_4)_{1/2}$, $(PO_4)_{1/3}$, F, Cl, I, Br, or $O \cdot CO \cdot CH_3$.

As described above, this invention provides an efficient, economical method which enables direct synthesis of pyridine bases from olefins and ammonia and maintenance of the synthetic activity of this reaction system over a long period of time without addition of fresh catalyst.

The invention will now be illustrated with reference to the following examples, but is not intended to be limited in any way by such examples.

EXAMPLE 1

In a 100 ml. autoclave were introduced 50 ml. of water and 0.025 mole of palladium tetrammine dichloride $$(Pd(NH_3)_4Cl_2 \cdot H_2O)$$

0.07 mole of ethylene was then added at an initial pressure of 36 kg./cm.², the autoclave was sealed, and the reaction was carried out at 120° C. for 5 hours. The autoclave was allowed to cool down to room temperature, gas was vented, the reaction mixture was extracted with ether, and the ether extract was analyzed by gas chromatography. Yield of α-picoline, 56 mg. (1.7%); selectivity, 14.57%; conversion of ethylene, 12.0%.

The conversion, selectivity, and yield were calculated as follows.

Conversion $$= \frac{\text{Charged olefin (mole)} - \text{unreacted olefin (mole)}}{\text{Charged olefin (mole)}} \times 100$$

Selectivity $$= \frac{\text{Product (mole)} \times a}{\text{Charged olefin (mole)} - \text{unreacted olefin (mole)}} \times 100$$

where $a=3$ for α-picoline and $a=4$ for 2-methyl-5-ethylpyridine. Yield=Conversion×selectivity.

EXAMPLE 2

In a 100 ml. autoclave were introduced 50 ml. of 28% aqueous ammonia (0.74 mole) and 0.05 mole of palladium chloride. 0.075 mole of ethylene was then added and the reaction was carried out at 280° C. for 3 hours. The results are as follows:

| | Amount, mg. | Yield, percent | Selectivity, percent |
|---|---|---|---|
| α-Picoline | 150 | 5.0 | 10.7 |
| 2-methyl-5-ethylpyridine | 62 | 2.1 | 4.5 |
| Conversion of ethylene | | 45.5 | |

EXAMPLE 3

In a 100 ml. autoclave were introduced 50 ml. of 28% aqueous ammonia (0.74 mole), $1 \times 10^{-4}$ gram atom of metallic palladium, and 0.1 mole of copper chloride ($CuCl_2$). 0.075 mole of ethylene was then added and the reaction was carried out at 200° C. for 4 hours. The results are as follows:

|  | Amount, mg. | Yield, percent | Selectivity, percent |
|---|---|---|---|
| α-Picoline | 141 | 4.7 | 6.2 |
| 2-methyl-5-ethylpyridine | 475 | 16.3 | 21.5 |
| Conversion of ethylene |  | 75.8 |  |

EXAMPLE 4

In a 100 ml. autoclave were introduced 0.9 mole of 28% aqueous ammonia, 0.0014 gram atom of palladium, 0.14 mole of copper chloride ($CuCl_2$), and 0.14 mole of ammonium chloride. 0.07 mole of ethylene was then added and the reaction was carried out at 200° C. for 5 hours. The results are as follows:

|  | Amount, mg. | Yield, percent | Selectivity, percent |
|---|---|---|---|
| α-Picoline | 83 | 3.9 | 7.3 |
| 2-methyl-5-ethylpyridine | 92 | 4.3 | 8.1 |
| Conversion of ethylene |  | 53.1 |  |

EXAMPLE 5

In a 100 ml. autoclave were introduced 0.9 mole of 28% aqueous ammonia, 0.0014 mole of palladium chloride, and 0.14 mole of copper chloride. 0.7 mole of ethylene was then added and the reaction was carried out at 200° C. for 5 hours. The results are as follows:

|  | Amount, mg. | Yield, percent | Selectivity, percent |
|---|---|---|---|
| α-Picoline | 113 | 5.2 | 6.8 |
| 2-methyl-5-ethylpyridine | 367 | 17.3 | 22.7 |
| Conversion of tehylene |  | 76.4 |  |

EXAMPLE 6

In a 100 ml. autoclave were introduced 0.7 mole of 28% aqueous ammonia, 0.0014 mole of palladium chloride, and 0.14 mole of copper chloride. 0.13 mole of ethylene was then added and the reaction was carried out at 200° C. for 5 hours. The results are as follows:

|  | Amount, mg. | Yield, percent | Selectivity, percent |
|---|---|---|---|
| α-Picoline | 145 | 3.6 | 4.3 |
| 2-methyl-5-ethylpyridine | 2,286 | 57.2 | 68.5 |
| Conversion of ethylene |  | 83.4 |  |

EXAMPLE 7

In a 100 ml. autoclave were introduced 0.74 mole of 28% aqueous ammonia, 0.15 mole of copper acetate ($Cu(CH_3 \cdot COO)_2 \cdot H_2O$) and 0.0075 mole of palladium chloride ($PdCl_2$). 0.2 mole of propylene was then added and the reaction was carried out at 230° C. for 2.5 hours. The conversion of propylene was 19% and the following pyridine bases were obtained: 2,4-lutidine, 208 mg.; 2,4,6-collidine, 92 mg.; 2,4-dimethyl-6-ethylpyridine, 110 mg.; α-picoline, 2,6-lutidine, 2,5-lutidine, 3,5-lutidine and the like in small amounts.

EXAMPLE 8

In a 100 ml. autoclave were introduced 0.7 mole of 28% aqueous ammonia, 0.14 mole of copper nitrate ($Cu(NO_3)_2 \cdot 3H_2O$), and 0.0014 mole of palladium nitrate ($Pd(NO_3)_2$. 0.14 mole of ethylene was then added and the reaction was carried out at 230° C. for 2 hours. Results: conversion of ethylene, 73.7%; selectivity of α-picoline, 22.8%; selectivity of 2-methyl-5-ethylpyridine, 14.2%.

EXAMPLE 9

The procedure of Example 8 was repeated using copper sulfate ($CuSO_4 \cdot 5H_2O$) in place of copper nitrate and palladium sulfate in place of palladium nitrate. Results: conversion of ethylene 47.4%; selectivity of α-picoline, 11.3%; selectivity of 2-methyl-5-ethylpyridine, 8.5%.

EXAMPLE 10

The reaction was carried out four times while repeating the cycle of reaction and introduction of oxygen.

In a 100 ml. autoclave were introduced 0.7 mole of 28% aqueous ammonia, 0.007 mole of palladium chloride, and 0.07 mole of copper chloride. 0.14 mole of ethylene was then added and the reaction was carried out at 200° C. for 2 hours shaking the autoclave.

After the reaction was over, gas was vented and air was introduced at room temperature to the autoclave until a pressure of about 10 kg./$cm.^2$ gauge was reached. The temperature was then raised to 100° C. and kept there until the absorption of oxygen no longer took place.

The second and subsequent reactions were carried out by venting gas after the introduction of oxygen, charging 0.14 mole of fresh ethylene without addition of ammonia and catalyst components, and observing the same conditions as in the first reaction.

Analysis of the reaction mixture after the fourth reaction and the average value of the conversion of ethylene are shown below.

|  | Amount, mg. | Yield, percent | Selectivity, percent |
|---|---|---|---|
| αPicoline | 346 | 1.6 | 2.7 |
| 2-methyl-5-ethylpyridine | 2,892 | 13.9 | 22.7 |
| C-onversion of ethylene, average |  | 64.1 |  |

EXAMPLE 11

In a 100 ml. autoclave were introduced 0.7 mole of 28% aqueous ammonia, 0.02 mole of palladium chloride, 0.1 mole of copper chloride, and 0.2 mole of ammonium chloride. 0.08 mole of ethylene was then added and the first reaction was carried out at 200° C. for 5 hours.

After the reaction was completed, the reaction mixture was treated with ether and chloroform to extract the pyridine bases.

Oxygen was passed into the residue remaining after the extraction at 70 to 90° C. under atmospheric pressure while adding ammonia, then ethylene was added, and the second reaction was carried out at 200° C. for 7 hours. The third reaction was then carried out in the same manner as the second. The results are as follows:

|  | Conversion of ethylene (percent) | Ammonia newly added (mole) | Product Amount (mg.) |  | Yield (percent) |  | Selectivity (percent) |  |
|---|---|---|---|---|---|---|---|---|
|  |  |  | α-P | MEP | α-P | MEP | α-P | MEP |
| 1st reaction | 59.2 |  | 122 | 543 | 4.9 | 22.3 | 8.3 | 33.7 |
| 2d reaction | 68.9 | 0.4 | 129 | 748 | 5.2 | 30.7 | 7.5 | 44.6 |
| 3d reaction | 60.0 | 0.6 | 137 | 591 | 5.5 | 24.3 | 9.1 | 40.4 |

NOTE.—α-P = α-picoline; MEP = 2-methyl-5-ethylpyridine.

EXAMPLE 12

The procedure of Example 10 was repeated except that the anions were changed and the reaction was repeated twice at 230° C. The results are as follows:

| Palladium compound | Copper compound | Conversion of ethylene (percent) | Selectivity (percent) | |
|---|---|---|---|---|
| | | | α-Picoline | 2-methyl-5-ethyl-pyridine |
| Nitrate | Nitrate | 70.5 | 24.0 | 12.8 |
| Chloride | Acetate | 52.5 | 11.7 | 22.6 |

EXAMPLE 13

In a 100 ml. autoclave were introduced 0.033 mole of trioxane, 0.001 mole of palladium chloride, 0.15 mole of copper salt, and 0.75 mole of 28% aqueous ammonia 0.1 mole of ethylene was then added, the reaction mixture was heated in about 20 minutes to 225° C. and stirred at that temperature for 4 hours. The results are shown below.

| Copper salt | Conversion (percent) | | Product yield (mg.) | | | | |
|---|---|---|---|---|---|---|---|
| | Ethylene | Trioxane | Pyridine | α-Picoline | β-Picoline | 2-methyl-5-ethyl-pyridine | Others |
| $CuCl_2 \cdot 2H_2O$ | 68 | 49 | 220 | 59 | 456 | 72 | 211 |
| $Cu(NO_3)_2 \cdot 3H_2O$ | 91 | 75 | 593 | 38 | 175 | 10 | 70 |
| $Cu(CH_3COO)_2 \cdot H_2O$ | 62 | 51 | 178 | 190 | 31 | 304 | 150 |

EXAMPLE 14

The procedure of Example 13 was repeated using 0.7 mole of 23% aqueous ammonia, 0.001 mole of palladium chloride, 0.1 mole of copper chloride, 0.05 mole of trioxane, and 0.1 mole of ethylene and then replacing trioxane with 0.05 mole of a variety of carbon sources. The results are as follows:

| Carbon source | Temperature (° C.) | Time (hr.) | Conversion of ethylene (percent) | Product yield (mg.) | | | |
|---|---|---|---|---|---|---|---|
| | | | | Pyridine | α-Picoline | β-Picoline | 2-methyl-5-ethyl-pyridine |
| Trioxane | 225 | 3.0 | 65.8 | 202 | 52 | 406 | 198 |
| Paraformaldehyde (90%) | 225 | 3.0 | 38.0 | 93 | 33 | 238 | 132 |
| Formalin (37%) | 225 | 3.0 | 40.7 | 84 | 22 | 132 | 126 |
| Methylene chloride | 225 | 3.0 | 36.6 | 96 | 30 | 226 | 663 |
| Methylal | 225 | 3.0 | 50.3 | 136 | 36 | 362 | 63 |
| Methanol | 225 | 3.0 | 42.5 | 13 | 54 | Trace | 240 |
| Methylamine | 225 | 3.0 | 55.8 | 150 | 93 | Trace | 185 |

We claim:

1. Method for preparing pyridine and alkylpyridines which comprises reacting an olefin selected from the group consisting of normal alkenes and alkadienes having 2–4 carbon atoms and mixtures thereof with the palladium tetrammine cation $[Pd(NH_3)_4]^{++}$ in an aqueous medium at a temperature of 100–300° C. and pressure of at least 20 kg./cm.$^2$ gauge.

2. The method according to claim 1, wherein the cation is provided by a water-soluble palladium tetrammine complex of the formula $$[Pd(NH_3)_4]X$$

wherein X is $(NO_3)_2$, $SO_4$, $(PO_4)_{2/3}$, $F_2$, $Cl_2$, $I_2$, $Br_2$ or $(O \cdot CO \cdot CH_3)_2$ in the reaction medium.

3. The method according to claim 1, wherein the cation is provided in situ by introducing Pd metal into the reaction medium, said reaction medium containing $$[Cu(NH_3)_4]^{++}$$

at least equimolar to the Pd metal.

4. The method according to claim 1, wherein the palladium tetrammine cation is provided with prolonged activity by means of the copper tetrammine cation $[Cu(NH_3)_4]^{++}$.

5. The method according to claim 4, wherein the copper tetrammine cation is provided by a water-soluble copper tetrammine complex of the formula $$[Cu(NH_3)_4]X$$

wherein X is $(NO_3)_2$, $SO_4$, $(PO_4)_{2/3}$, $F_2$, $Cl_2$, $I_2$, $Br_2$ or $(O \cdot CO \cdot CH_3)_2$ in the reaction medium.

6. The method according to claim 4, wherein oxygen or a gas containing oxygen and inert gases is introduced into the reaction system at a temperature from room temperature to 300° C. under at least atmospheric pressure after stopping the reaction.

7. The method according to claim 4, wherein oxygen or a gas containing oxygen and inert gases is introduced into the reaction system during the reaction at a temperature from 100 to 300° C. and pressure at least 20 kg./cm.$^2$ gauge.

8. The method according to claim 4, wherein the molar ratio of palladium tetrammine cation to copper tetrammine cation is at least 1:200.

9. The method according to claim 1, wherein at least one compound selected from the group consisting of formaldehyde, paraformaldehyde, trioxane, methylene chloroform, formic acid and formamide is added to the reaction system.

10. The method according to claim 1, wherein an alcohol is added to the reaction medium.

11. The method according to claim 1, wherein the olefin is ethylene.

12. The method according to claim 1, wherein the cation is provided in situ by introducing a palladium salt selected from the group consisting of palladium nitrate, palladium sulphate, palladium phosphate, palladium fluoride, palladium chloride, palladium bromide and palladium acetate into the reaction medium, said reaction medium containing ammonia in a molar amount of at least twice as much as the palladium salt.

13. The method according to claim 4, wherein the copper tetrammine cation is provided in situ by introducing a copper salt selected from the group consisting of cupric nitrate, cupric sulphate, cupric phosphate, cupric fluoride, cupric chloride, cupric bromide, cupric iodide and cupric acetate into the reaction medium, said reaction medium containing ammonia in a molar amount of at least twice as much as the copper salt.

14. The method according to claim 1, wherein a compound selected from the group consisting of nitric acid, sulfuric acid, phosphoric acid, hydrogen fluoride, hydrochloric acid, hydrogen iodide, hydrogen bromide and acetic acid is added to the reaction medium.

15. The method according to claim 1, wherein a compound selected from the group consisting of ammonium nitrate, ammonium sulphate, ammonium phosphate, ammonium fluoride, ammonium chloride, ammonium iodide, ammonium bromide and ammonium acetate is added to the reaction medium.

References Cited

UNITED STATES PATENTS

| | | | |
|---|---|---|---|
| 2,744,903 | 5/1956 | Boettner | 260—290 |
| 2,717,897 | 9/1955 | Dunn | 260—290 |

OTHER REFERENCES

Henry, J. Am. Chem. Soc., vol. 86, pp. 3246–50 (1964).

HARRY I. MOATZ, Primary Examiner

UNITED STATES PATENT OFFICE
CERTIFICATE OF CORRECTION

Patent No. 3,781,292     Dated December 25, 1973

Inventor(s) Yasuo KUSUNOKI, Hiroshi OKAZAKI, Yoshinori SATO and Eiichi SANO

It is certified that error appears in the above-identified patent and that said Letters Patent are hereby corrected as shown below:

In the Heading of the Patent (top of column 1) change

"Yawata Chemical Industry Co., Ltd." to

--Nippon Steel Chemical Co., Ltd.--.

Signed and sealed this 1st day of October 1974.

(SEAL)
Attest:

McCOY M. GIBSON JR.
Attesting Officer

C. MARSHALL DANN
Commissioner of Patents